(12) United States Patent
Dikshit et al.

(10) Patent No.: US 11,502,927 B2
(45) Date of Patent: Nov. 15, 2022

(54) TRAFFIC FLOW TRACE IN A NETWORK

(71) Applicant: HEWLETT PACKARD ENTERPRISE DEVELOPMENT LP, Houston, TX (US)

(72) Inventors: Saumya Dikshit, Bangalore (IN); Vinayak Joshi, Bangalore (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 17/221,813

(22) Filed: Apr. 4, 2021

(65) Prior Publication Data

US 2022/0191120 A1 Jun. 16, 2022

(30) Foreign Application Priority Data

Dec. 16, 2020 (IN) .............................. 202041054765

(51) Int. Cl.
*H04L 43/0882* (2022.01)
*H04L 43/0823* (2022.01)
(Continued)

(52) U.S. Cl.
CPC ...... *H04L 43/0882* (2013.01); *H04L 12/4633* (2013.01); *H04L 43/0817* (2013.01);
(Continued)

(58) Field of Classification Search
CPC ............. H04L 43/0882; H04L 12/4633; H04L 43/0817; H04L 43/0823; H04L 45/24; H04L 45/28; H04L 45/38
See application file for complete search history.

(56) References Cited

U.S. PATENT DOCUMENTS 9,699,030 B1 * 7/2017 Kumar ................ H04L 41/0853
10,880,121 B1 * 12/2020 J ........................ H04L 12/4633
(Continued)

OTHER PUBLICATIONS

Arista, "Rapid Automated Indication of Link-Loss", White Paper, 2016, 6 pages.
(Continued)

*Primary Examiner* — Patrice L Winder
(74) *Attorney, Agent, or Firm* — Hewlett Packard Enterprise Patent Department (57) ABSTRACT

An example network orchestrator of a SDN is configured to receive, based on a user input, credentials associated with a traffic flow. Based on the credentials, it is determined whether the traffic flow is received at an ingress overlay network node. Route information and encapsulation information of the traffic flow is extracted from the ingress overlay network node. A first set of underlay network nodes each of which is a potential next hop for the traffic flow is identified. It is determined, based on the encapsulation information, whether the traffic flow is received by one of the first set of underlay network nodes. It is determined whether the traffic flow is received at an egress overlay network node from one of the first. A network trace of the traffic flow is determined based on the determinations of whether the traffic flow is received at the ingress overlay network node, one of the first set of underlay network nodes, and the egress overlay network node. Based on the network trace, a fault in a link between network nodes or in the ingress overlay network node or in the egress overlay network node or in one of the first set of underlay network nodes is detected.

20 Claims, 4 Drawing Sheets

(51) Int. Cl.
*H04L 43/0817* (2022.01)
*H04L 12/46* (2006.01)
*H04L 45/00* (2022.01)
*H04L 45/24* (2022.01)
*H04L 45/28* (2022.01)

(52) U.S. Cl.
CPC .......... *H04L 43/0823* (2013.01); *H04L 45/24* (2013.01); *H04L 45/28* (2013.01); *H04L 45/38* (2013.01)

(56) References Cited

U.S. PATENT DOCUMENTS

| | | | |
|---|---|---|---|
| 10,924,419 B1 * | 2/2021 | Chitalia | H04L 43/045 |
| 2015/0244617 A1 * | 8/2015 | Nakil | H04L 43/0852 |
| | | | 709/224 |
| 2021/0385149 A1 * | 12/2021 | Suryanarayana | H04L 45/02 |

OTHER PUBLICATIONS

Cisco, "Cisco Nexus 7000 Series NX-OS Fundamentals Configuration Guide", available online at <https://www.cisco.eom/c/en/us/td/docs/switches/datacenter/nexus7000/sw/fundamentals/config/cisco_nexus7000_fundamentals_config_guide_8x/cisco_nexus7000_fundamentals_config_guide_8x_chapter_01100.html>, retrieved on Jun. 11, 2021, 10 pages.

* cited by examiner

TRAFFIC FLOW TRACE IN A NETWORK

BACKGROUND

An enterprise network may extend across multiple sites (e.g. geographical, logical). Sites of the enterprise network are interconnected so that devices at one site can access resources at another site. In some topologies, many services and resources are installed at core sites (e.g. datacenters, headquarters), and many branch sites (e.g. regional offices, retail stores) connect client devices (e.g. laptops, smartphones, internet of things devices) to the enterprise network. These types of topologies are often used by enterprises in establishing their corporate network.

Generally, in network deployments, such as datacentre or campus networks, a virtual network may be deployed as an overlay on top a physical network of network devices, such as routers and switches. Nodes in an overlay network may be connected by virtual or logical links, each of which may include paths to transport data through multiple physical links in an underlay network. The underlay network includes the physical network infrastructure of network devices for transporting packets from source to destination.

The underlay network, which is the physical network infrastructure above which the overlay network is built, is responsible for delivery of packets across networks. The underlay network is described by the physical devices and can be switches and routers in the network. All network components of the underlay network use IP connectivity via the use of a routing protocol.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Certain examples have features that are in addition to or in lieu of the features illustrated in the above-referenced figures. Certain labels may be omitted from certain figures for the sake of clarity.

DETAILED DESCRIPTION

Overlay networks generally use encapsulation for forwarding the data packets. Encapsulation enables the data packets to be marked with specific information for forwarding in the overlay network generally using a network tunnel which may be a virtual tunnel connecting two tunnel endpoints in the overlay network. When encapsulated data packets are transported through the network tunnel, network devices, such as switches and routers, in the underlay network forwards the encapsulated data packets based on the addresses of tunnel endpoints. The underlay networks are deployed such that there are multiple paths between tunnel endpoints. This provides redundancy and load balancing of traffic across underlay paths. A given traffic flow between the tunnel endpoints can traverse any of these paths. The path is determined by the traffic load balancing schemes of the underlay switches and routers.

Since, the network devices in the underlay network forward the encapsulated data packets, they are unaware of the inner packet credentials, such as source and destination addresses, of the unencapsulated data packets. The inner packet refers to an unencapsulated data packet originating from a source device and including control information and user data, i.e., payload. In general, the payload is the data that is carried on behalf of an application. In an example, the inner packet credentials may refer to Media Access Control (MAC) addresses of the source and destination of a data packet in layer 2 or Internet Protocol (IP) addresses of the source and destination of a data packet in layer 3. Thus, if a traffic flow from a specific source device to a specific destination device is to be traced using the source and destination addresses, the network devices in the underlay network may not be able to identify and isolate the traffic flow. As a result, a specific traffic flow may not be traced at the network devices in the underlay network based on source and destination address of the traffic flow.

The present disclosure relates to techniques for tracing a traffic flow, at both overlay and underlay network nodes, so that a complete network trace of the traffic flow from the source to the destination may be obtained and detecting a failure in the network based on the network trace. In an example, a network orchestrator may receive, credentials associated with the traffic flow based on a user input. The traffic flow may include a sequence of data packets from a source server to a destination server. In an example, the source and destination servers may be separate host devices. The credentials of the traffic flow may be indicative of information of the traffic flow that may be used to trace the traffic flow. The credentials may include an Internet Protocol (IP) address of a source server and a Transmission Control Protocol (TCP)/User Datagram Protocol (UDP) port address of a specific application in the source server and an IP address of the destination server and TCP/UDP port address of a specific application in the destination server, where the traffic flow is directed from the source server to the destination server.

Based on the credentials, the network orchestrator may determine whether the traffic flow is received at an ingress overlay network node. The ingress overlay network node may be a network node at an ingress side of the traffic flow. The ingress overlay network node receives the traffic flow from a source server. In an example, in a leaf-spine network topology, the ingress overlay network node may a network device, such as a switch, in the leaf layer which is directly connected to the source server. In an example, the ingress overlay node may be a Virtual Tunnel Endpoint (VTEP) in an overlay VXLAN network.

The network orchestrator may extract route information and encapsulation information of the traffic flow from the ingress overlay network node based on the credentials. The route information may be indicative of a path of the traffic flow through the network from the source to the destination. In an example, the path may be through multiple network devices, such as switches, in the leaf layer and the spine layer, in a leaf-spine network. The encapsulation information may be indicative of header information included in the data packets of the traffic flow when the traffic flow passes in an overlay network, such as via network devices in the leaf layer. In example, the encapsulation information may include tunnel header information in VXLAN overlay networks. In an example, the encapsulation information is generated based on a tunneling protocol.

Based on the route information, the network orchestrator may identify a first set of underlay network nodes each of which is a potential next hop for the traffic flow. In an example, the underlay network nodes may be network devices in a spine layer of the leaf-spine network, which receives the traffic flow from the ingress side, such as from the ingress overlay network node. A potential next hop refers to an underlay network node, such as a network switch in a spine layer, acting as a receiver of the traffic flow from the ingress overlay network node, such as an ingress VTEP in case of a VXLAN overlay network. In an example, each of the first set of underlay network nodes may forward data packets to the overlay network nodes based on the encapsulation information.

The network orchestrator may determine whether the traffic flow is received by one of the first set of underlay network nodes based on the encapsulation information. Further, the network orchestrator may also determine, based on the credentials, whether the traffic flow is received at an egress overlay network node from one of the first set of underlay network nodes. The egress overlay node may be a network node at an egress side of the traffic flow. In an example, the egress overlay network node may receive the traffic flow from a network device in the underlay network. In an example, in a leaf-spine network topology, the egress overlay network node may be a network device, such as a switch, in the leaf layer which is in direct connection with the destination server. In an example, the egress overlay node may be a VTEP in an overlay VXLAN network.

Based on the determinations of whether the traffic flow is received at the ingress overlay network node, one of the first set of underlay network nodes, and the egress overlay network node, the network orchestrator may determine a network trace of the traffic flow. The network trace includes a list of underlay switch/router hops as a packet is routed through a network. The network trace may be indicative of data packets received at different network devices in the path of the traffic flow form the source to the destination. In an example, the network trace may also indicate a number of packets received and rate of data transfer of the traffic flow at different network devices. Thus, the network trace of the traffic flow from the source server to the destination server may be obtained with information of the traffic flow at network devices in intermediate hops. Thus, in the present disclosure, the traffic flow can be traced in both overlay and underlay networks using inner packet credentials, such as IP addresses of the source and destination for a traffic flow in layer 3 and MAC addresses of the source and destination for a traffic flow in layer 2. As a result, a comprehensive network trace may be obtained at both the overlay and underlay networks. Based on the network trace, a failure in the network may be detected. The failure may include one of a fault in a link between network nodes, a fault in the ingress overlay network node, a fault in the egress overlay network node, and a fault in one of the set of underlay network nodes. Further, the present disclosure allows data packet tracing using live application traffic, consequently avoiding generation of artificial or test data packets for tracing. Also, the present disclosure does not require the packet headers to be modified with markers or flags for tracing, thereby preventing chances of tampering with the traffic flow.

Figure 1:
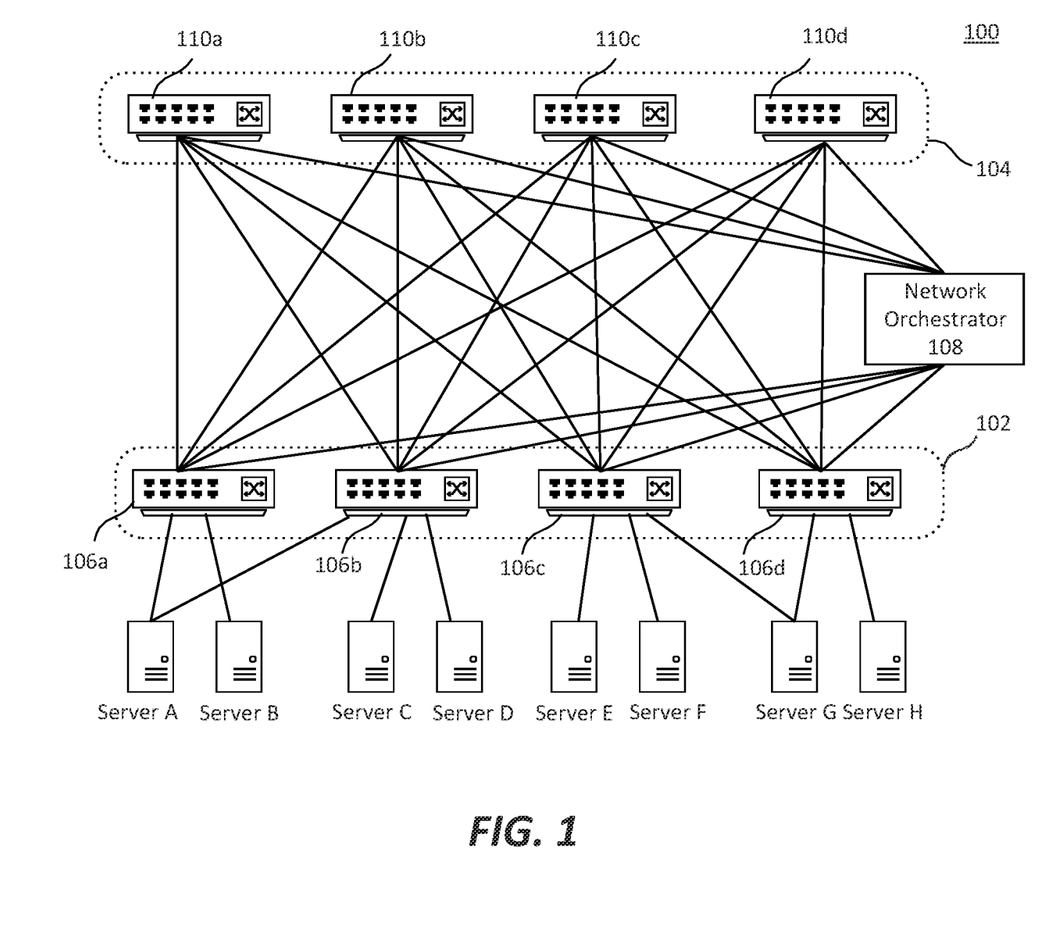
FIG. 1 illustrates an example datacenter network for tracing traffic flow in the datacenter network.

FIG. 1 illustrates an example datacenter network 100 including an overlay network 102 and an underlay network 104. The datacenter network 100 has a leaf-spine topology, where the overlay network 102 is at the leaf layer and the underlay network 104 is at the spine layer. The overlay network 102 includes network devices 106a-106d, collectively referred to as network devices 106. Examples of the network devices 106 includes switches and routers. In an example, the overlay network may be based on MAN and each of network devices 106 may act as Virtual Tunnel Endpoints (VTEPS) in the VXLAN overlay network. Overlay networks based on VXLANs transport frames after encapsulating them as VXLAN packets. Encapsulation and de-encapsulation in these networks are done by the VTEPS. Datacenter network 100 includes a network orchestrator 108 connected to network devices 106 via a port in each of the network devices 106. In an example, the network orchestrator 108 may be connected to the network devices 106 over the Internet.

Datacenter network 100 includes server A connected to network devices 106a and 106b via ports of the network devices 106a and 106b, server B connected to network device 106a via a port of the network device 106a, servers C and D connected to network device 106b via ports of the network device 106b, servers E and F connected to network device 106c via ports of the network device 106c, server G connected to network devices 106c and 106d via ports of the network devices 106c and 106d, and server H connected to network device 106d via a port of the network device 106d. The servers A to H that host applications are deployed within racks. In an example, the network device 106 may be a Top of the Rack (ToR) switch, also called as leaf, that connects the systems within the rack as well as to other switches, such as spine switches. In an example, the servers A to H may transmit east-west traffic between each other. East-west traffic refers to flow of data among devices within a specific data center or a campus network.

The underlay network 104 includes network devices 110a-110d, collectively referred to as network devices 110. Examples of the network devices 110 includes switches. The network orchestrator 108 is connected to network devices 110 via a port in each of the network devices 110. In an example, the network orchestrator 108 may be connected to the network devices 110 over the Internet.

In an example, a network device 110, also referred to as a spine switch connects to the network devices 106, i.e., the leaves as well as provide connectivity to other Spine switches through another layer of Switch (not shown). As shown in FIG. 1, each of the network devices 106 are connected to each of the network devices 110, via physical links. Although, FIG. 1 illustrates a datacenter network in a leaf-spine topology to explain aspects of the present disclosure, aspects of the present invention is applicable mutatis mutandis to other networks, such as a campus network, and other network topologies, such as a hierarchical internetworking model.

With reference to FIG. 1, consider that server A generates a traffic flow destined for server G. To trace the traffic flow from server A to server G, a network administrator may provide a user input in the network orchestrator 108. The user input includes credentials associated with the traffic flow. In an example, the credentials include an Internet Protocol (IP) address of the server A, a Transmission Control Protocol (TCP)/User Datagram Protocol (UDP) port address to identify a specific service/application in the server A, an IP address of the server G, and TCP/UDP port address of the specific service/application in the server G.

In an example, the network orchestrator 108 may query the Forwarding Information Base (FIB) on an ingress overlay network node with the credentials of the traffic flow. A network device which is connected to the source of the traffic flow may be referred to as the ingress overlay network node. With reference to FIG. 1, server A, which is the source of the traffic flow, is connected to network devices 106a and 106b. Thus, the network orchestrator 108 may query the FIB on the network devices 106a and 106b with the credentials of the traffic flow.

In response to the querying, the network orchestrator 108 may determine that the traffic flow from server A is received, say, at network device 106a. Thus, the network device 106a which is connected to the server A, i.e., source of the traffic flow, may be referred to as an ingress overlay network node 106a. If the traffic flow is present in the FIB of the ingress overlay network node 106a, the network orchestrator 108 determines that the traffic flow is received at the ingress overlay network node 106a. In an example, the network orchestrator 108 determines whether the traffic flow from server A is received at the ingress overlay network node within a threshold time. If the traffic flow is not received at the ingress overlay network node 106a within the threshold time, the network orchestrator 108 may detect that there is a fault in the link between the server A and the ingress overlay network node 106a.

In response to determining that the traffic flow is received at the ingress overlay network node 106a, the network orchestrator 108 may determine the potential next hops for the traffic flow. A next hop may be referred to the next network device, such as a switch or router, to which data packets should be forwarded along the path to their final destination. The FIB or forwarding table in the ingress overlay network node 106a may contain the IP address of a destination device and the IP address of the next network device along the path to the final destination. Thus, a potential next hop from the ingress network overlay node 106a may refer to one or more network devices in the spine layer 104 which may receive the traffic flow from the ingress network overlay node 106a. The network orchestrator 108 may query the FIB of the ingress network device 106a to determine network devices 110a to 110d as the potential next hops. In an example, the network orchestrator 108 may identify a path for the traffic flow from the ingress overlay network node 106a to the server G via the underlay network 104. In another example, the ingress overlay network node 106a may determine a route for the traffic flow based on the credentials. The ingress overlay network node 106a may identify the route and store route information in its FIB. The network orchestrator 108 may extract the route information of the traffic flow from the FIB. In an example, the route information includes an IP address of an egress overlay network node, a virtual network identifier (VNI), and an IP address and Media Access Control (MAC) address of each of a first set of underlay network nodes. The network device(s) connected to the server G, i.e., destination of the traffic flow, may be referred to as egress overlay network node. Each of the network devices 110 may be referred to as underlay network nodes 110. The VNI may indicate a specific virtual network, such as a specific VXLAN, through which the traffic flows.

The ingress overlay network node 106a may also encapsulate the traffic flow to be sent to the underlay layer 104. The encapsulation of the traffic flow may be performed based on encapsulation information. In an example, the encapsulation information may be generated based on a tunneling protocol implemented in the overlay network 102. In an example, the encapsulation information may include IP address of the ingress overlay network node 106a, IP address of the egress overlay network node, UDP encapsulation source port address, and UDP encapsulation destination port address. The encapsulation information may include, for example, information included in a VXLAN header. In an example, the UDP encapsulation destination port address is set as 4798 which is defined as the standard VXLAN port by the Internet Assigned Numbers Authority (IANA). The UDP encapsulation source port address may be set as the port addresses of a collection of ephemeral ports. An ephemeral port is a short-lived transport protocol port for IP communications. Ephemeral ports are allocated automatically from a predefined range by an IP stack software. An ephemeral port is typically used by the Transmission Control Protocol (TCP), User Datagram Protocol (UDP), or the Stream Control Transmission Protocol (SCTP) as the port assignment for the client end of a client-server communication to a particular port on a server.

The network orchestrator 108 may compare the encapsulation information of data packets received at each of the first set of underlay network nodes 110 with the encapsulation information of the traffic flow. In an example, data packets received at each of the underlay network devices 110 may be filtered based on the encapsulation information of the traffic flow. The network orchestrator 108 may check if the encapsulation of data packets received at the underlay network node 110a matches with the encapsulation information of the traffic flow. In response to a match of encapsulation information at one of the set of underlay network nodes, say, at underlay network node 110a, the network orchestrator 108 identifies that the traffic flow is received at the underlay network node 110a.

Although FIG. 1, illustrates a single underlay layer 104, there may be more than one underlay layers. In an example, in response to determining that the traffic flow is received at one of the first set of underlay network nodes, the network orchestrator 108 may identify a second set of underlay network nodes based on a combination of the route information and data paths originating from the one of the first set of underlay network nodes. In an example, data paths originating from one of the first set of underlay network nodes include potential next hops from the underlay network nodes receiving the traffic flow. In an example, the potential next hops may be determined based on Equal Cost Multi-Path (ECMP) routing. The network orchestrator 108 may also determine, based on the encapsulation information, whether the traffic flow received by one of the second set of underlay network nodes.

In response to determining that the traffic flow is received at the underlay network node 110a, the network orchestrator 108 may query the FIB of the underlay network node 110a to identify the potential next hops of the traffic flow. As per FIG. 1, network devices 106c and 106d may be identified as the potential next hops. The network devices 106c and 106d are connected to the destination, server G, and may be referred to as egress overlay network nodes 106c and 106d. The network orchestrator 108 may apply filters in the egress overlay network nodes 106c and 106d using the credentials of the traffic flow. Based on the applied filters in the egress overlay network nodes 106c and 106d, the network orchestrator 108 may check whether the traffic flow is received at one of the egress overlay network nodes 106c and 106d from the underlay network node 110a within a threshold time. Thus, the network orchestrator 108 may determine that the traffic flow is received at the egress overlay network node 106c from the underlay network nodes 110.

Based on the determinations of whether the traffic flow is received at the ingress overlay network node 106a, one of the first set of underlay network nodes 110, and the egress overlay network node 106c, the network orchestrator 108 may determine a network trace of the traffic flow. In an example, the network trace is indicative of information about flows traversing through the network nodes and the results of forwarding decisions for identified flows such as—forward and drop. The network trace may also provide information about the data path of the flow. In an example, the network trace may include a flow ID for the identified traffic flow that is tracked, a timestamp when the traffic flow is received at each of the ingress network node, underlay network node, and egress network node, source interface, destination interface, source MAC, destination MAC, source IP, destination IP, source VNI, destination VNI, source VLAN, destination VLAN, source bridge domain, destination bridge domain, etc. Thus, if the traffic flow is dropped at one or more network nodes, the same may be detected from the network trace.

In an example, if the traffic flow is not received at either of the ingress network nodes 106a and 106b, the network orchestrator 108 may detect that there is fault in the ingress network node 106a or 106b or a fault in the link between the server A and the ingress network nodes 106a and 106b. Likewise, if the traffic flow is not received at the one of the underlay network nodes 110 from the ingress overlay network node, the network orchestrator 108 may detect that there is fault in the underlay network nodes 110 or a fault in the link between the ingress network nodes 106a and 106b and the underlay network nodes 110. Thus, based on the network trace, the network orchestrator 108 may detect a failure in the network 100. The failure may include one of a fault in a link between network nodes, a fault in the ingress overlay network node, a fault in the egress overlay network node, and a fault in one of the set of underlay network nodes. In other examples, based on the network trace, the network orchestrator 108 may analyze network problems, detect network intrusion attempts, detect network misuse by internal and external users document regulatory compliance, aid in gathering information to isolate exploited systems, monitor WAN bandwidth utilization, monitor network usage, monitor WAN and endpoint security status, gather and report network statistics, identify suspect content in network traffic, troubleshoot performance problems by monitoring network data from an application, serve as the primary data source for day-to-day network monitoring and management, debug client/server communications, etc.

Figure 2:
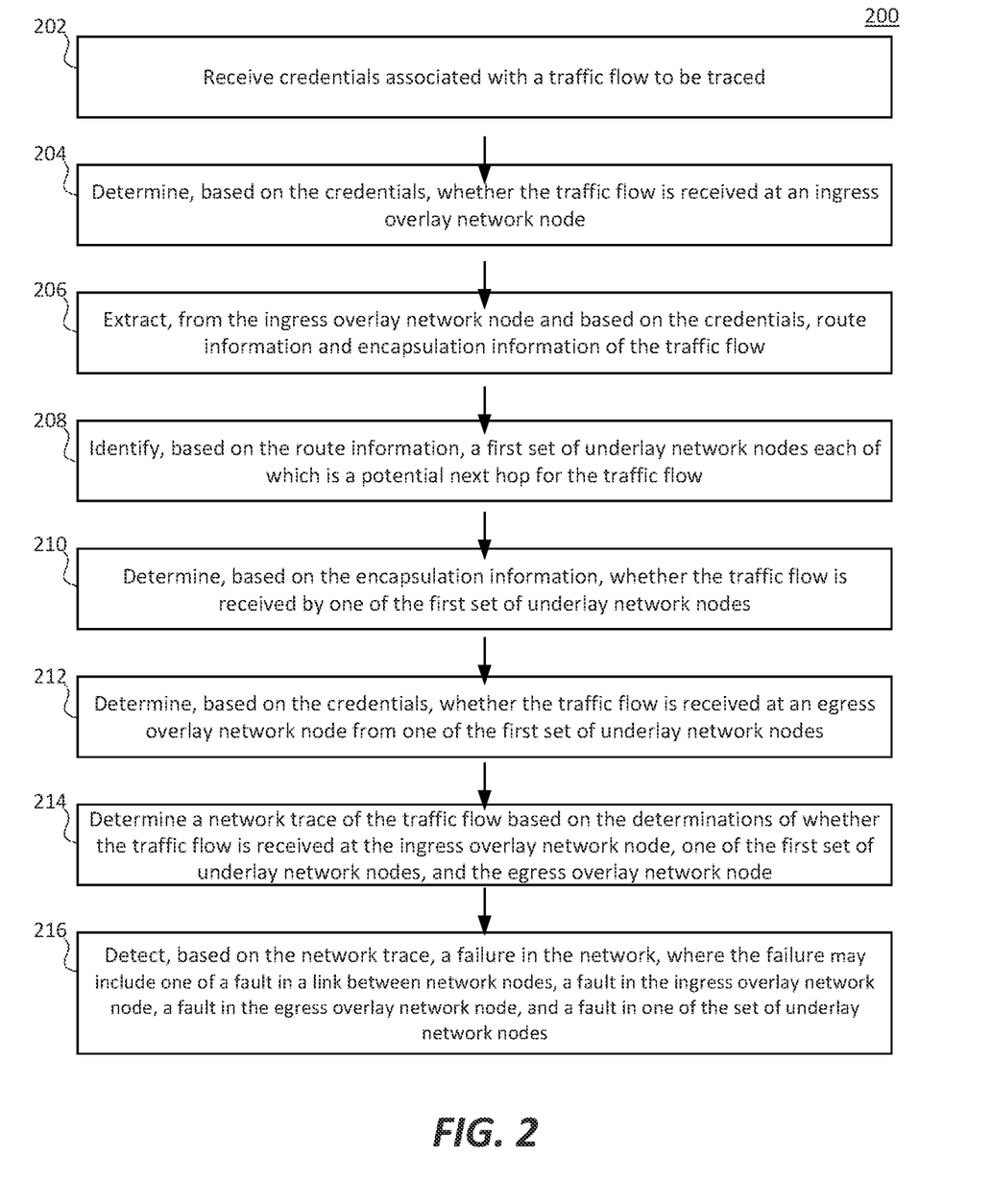
FIG. 2 is a flowchart illustrating an example method for tracing traffic flow in a network.

FIG. 2 is a flowchart illustrating an example method 200 for tracing a traffic flow in a network. Method 200 may be executed on a network orchestrator, such as the network orchestrator 108 of FIG. 1.

In block 202, a user input is received by the network orchestrator. The user input includes credentials associated with the traffic flow. In an example the credentials associated with the traffic flow include an Internet Protocol (IP) address and a Transmission Control Protocol (TCP)/User Datagram Protocol (UDP) port address of a source server and an IP address and TCP/UDP port address of a destination server, where the traffic flow is directed from the source server to the destination server.

In block 204, it is determined based on the credentials, whether the traffic flow is received at an ingress overlay network node. In an example, an ingress overlay network node may be a network node in the overlay network connected to the source server.

In block 206, route information and encapsulation information of the traffic flow is extracted from the ingress overlay network node based on the credentials. In an example, the encapsulation information is generated based on a tunneling protocol. The encapsulation information includes IP address of the ingress overlay network node, IP address of an egress overlay network node, UDP encapsulation source port address, and UDP encapsulation destination port address. In an example, the route information includes an IP address of the egress overlay network node, a virtual network identifier (VNI), and an IP address and Media Access Control (MAC) address of each of a first set of underlay network nodes.

In block 208, a first set of underlay network nodes is identified based on the route information. In an example, each of the first set of underlay networks is a potential next hop for the traffic flow. In an example, each of the set of underlay network nodes is identified as the potential next hop based on Equal Cost Multi-Path (ECMP) routing.

In block 210, it is determined, based on the encapsulation information, whether the traffic flow is received by one of the first set of underlay network nodes. In an example, encapsulation information of data packets received at each of the first set of underlay network nodes is compared with the encapsulation information of the traffic flow. In response to a match of encapsulation information at one of the set of underlay network nodes, it is identified that the traffic flow is received at the one of the set of underlay network nodes.

In block 212, it is determined, based on the credentials, whether the traffic flow is received at an egress overlay network node from one of the first set of underlay network nodes. The egress overlay network node may be connected to the destination server. In an example, the egress overlay network node is a tunnel endpoint, such as a VTEP in a VXLAN overlay network.

In block 214, a network trace of the traffic flow is determined based on the determinations of whether the traffic flow is received at the ingress overlay network node, one of the first set of underlay network nodes, and the egress overlay network node. The network trace is indicative of information about flows traversing through the network nodes and the results of forwarding decisions for identified flows such as—forward and drop. In block 216, a failure in the network is detected based on the network trace. In an example, the failure includes one of a fault in a link between network nodes, a fault in the ingress overlay network node, a fault in the egress overlay network node, and a fault in one of the set of underlay network nodes.

Figure 3:
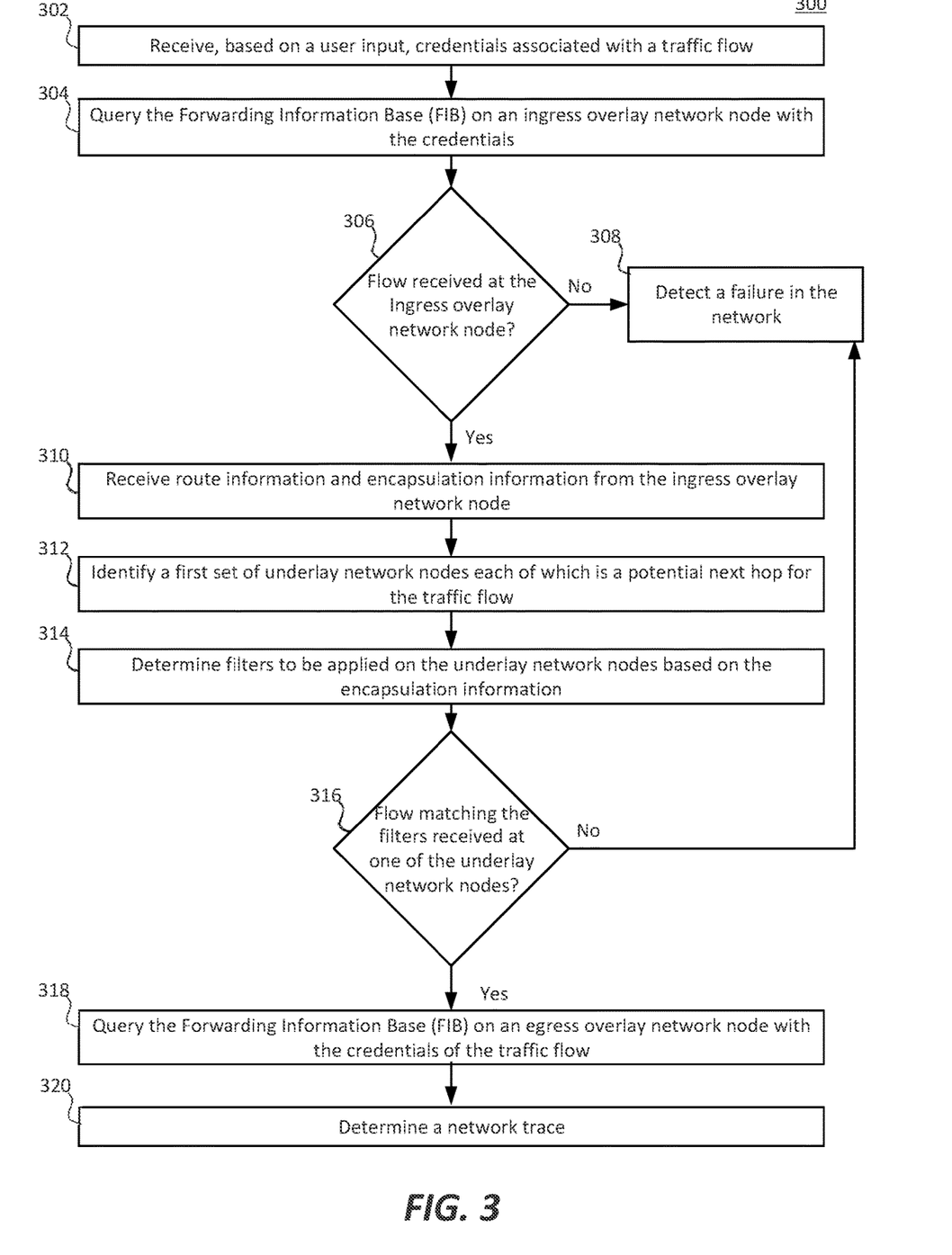
FIG. 3 is a flowchart illustrating another example method for tracing traffic flow in a network.

FIG. 3 is a flowchart illustrating an example method 300 for tracing a traffic flow in a network. Method 300 may be executed on a network orchestrator, such as the network orchestrator 108 of FIG. 1.

In block 302, user input including credentials of a traffic flow to be traced is received. The credentials is indicative of information about the traffic flow to be traced. In an example, the credentials may be control information, such as source and destination addresses included in an ethernet frame. A user may identify the traffic flow to be traced based on the credentials.

In block 304, a FIB of an Ingress overlay network node may be queried with the credentials. In an example, the ingress overlay network node may be a network device, such as a router or a switch, connected to the source of the traffic flow. The ingress overlay network node may act a tunnel endpoint of a virtual tunnel in the overlay network. For example, the ingress overlay network node may act as a VTEP in a VXLAN overlay network. Querying the ingress overlay network node includes checking the FIB of the ingress overlay network node for data packets of the traffic flow having the credentials provided in the user input. In an example, the FIB may be checked for a traffic flow with source and destination addressed mentioned in the credentials. If such a traffic flow is present in the FIB, it may be determined that the traffic flow is received at the ingress overlay network node.

Based on the querying, it is checked whether the traffic flow associated with the input credentials is received at the ingress overlay network node, in block 306. In case, the traffic flow is not received at the ingress overlay network node, it is determined that there is a failure in the network, in block 308. In an example, the failure may include one of a fault in a link between network nodes, a fault in the ingress overlay network node.

In response to determining that the traffic flow is received at the ingress overlay network node, in block 310, route information and encapsulation information of the traffic flow is received from the ingress overlay network node. In an example, the route information includes an IP address of the egress overlay network node, a virtual network identifier (VNI), and an IP address and Media Access Control (MAC) address of each of the first set of underlay network nodes. The encapsulation information is generated based on a tunneling protocol. The encapsulation information includes IP address of the ingress overlay network node, IP address of the egress overlay network node, UDP encapsulation source port address, and UDP encapsulation destination port address.

In block 312, based on the route information, a first set of underlay network nodes is identified each of which is a potential next hop for the traffic flow. In block 314, filters to be applied on the underlay network nodes are determined based on the encapsulation information. In an example, applying the filters may include setting the source IP address to be the IP address of an ingress overlay network node, such as an Ingress VTEP, setting the destination IP address to be IP address of an egress overlay network node, such as an egress VTEP, setting the source port address to be addresses of a set of ephemeral ports, and setting the destination port address to be the address of the standard VXLAN port may be. In an example, applying the filters based on the encapsulation information includes checking the FIB of each of the underlay network nodes for traffic flow matching with specific source IP address, source port address, destination IP address and destination port address, as mentioned in the filters.

In block 316, it is checked whether the traffic flow matching the filters is received at one of the underlay network nodes. If the traffic flow matching the filters is not received, it may be determined that there is a failure in the network. If the traffic flow matching the filters is received at one of the underlay network nodes, in block 318, the FIB on an egress overlay network node is queried with the credentials of the traffic flow to determine whether the traffic flow is received at an egress overlay network node from one of the first set of underlay network nodes. Based on the determinations in blocks 306, 316, and 318 a network trace of the traffic flow may be determined. In some examples, based on the network trace, the network orchestrator may analyze network problems, detect network intrusion attempts, detect network misuse by internal and external users document regulatory compliance, aid in gathering information to isolate exploited systems, monitor WAN bandwidth utilization, monitor network usage, monitor WAN and endpoint security status, gather and report network statistics, identify suspect content in network traffic, troubleshoot performance problems by monitoring network data from an application, serve as the primary data source for day-to-day network monitoring and management, debug client/server communications, etc.

Figure 4:
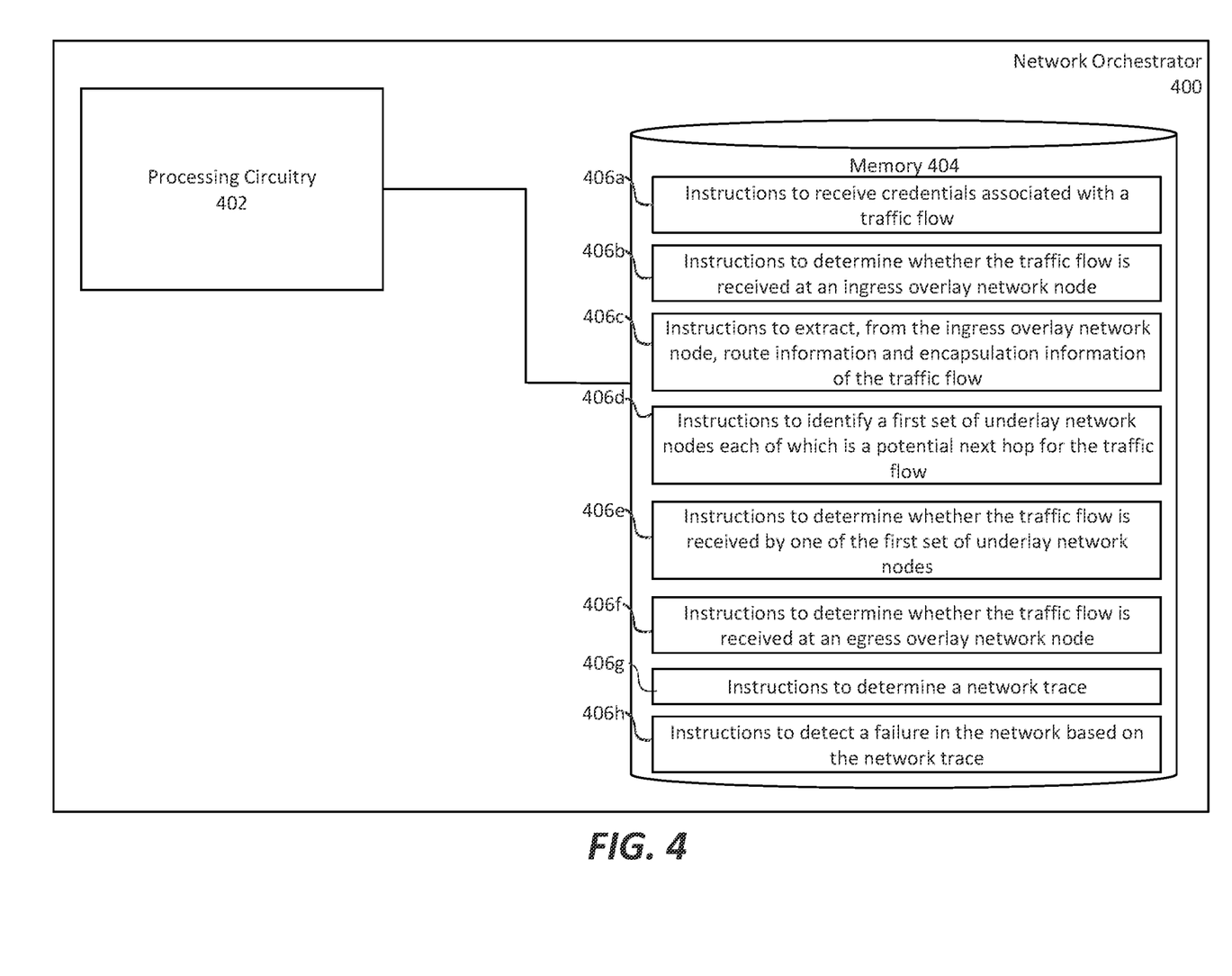
FIG. 4 is an illustration of an example network orchestrator for tracing traffic flow.

FIG. 4 is an illustration of an example network orchestrator 400 for tracing traffic flow in a network. As previously mentioned, actions and operations described in this disclosure can be executed on a network orchestrator, on any other appropriate device or service, or any combination thereof.

Network Orchestrator 400 includes processing circuitry 402 communicatively coupled to memory 404. Memory 404 includes instructions 406 that, when executed on processing circuitry 402, cause network orchestrator 400 to perform various actions. For example, instructions 406a cause network orchestrator 400 to receive, based on a user input, credentials associated with a traffic flow. The credentials may, in some examples, include an Internet Protocol (IP) address and a Transmission Control Protocol (TCP)/User Datagram Protocol (UDP) port address of a source server and an IP address and TCP/UDP port address of a destination server, wherein the traffic flow is directed from the source server to the destination server.

Instructions 406b cause network orchestrator 400 to determine, based on the credentials, whether the traffic flow is received at an ingress overlay network node. The ingress overlay network node may be a network device, such as switch, connected to the source server. In an example, in a datacenter network deployment the ingress overlay network node may be top of the rack (ToR) switch. The ingress overlay network node may function as a tunnel endpoint of the overlay network.

Instructions 406c cause network orchestrator 400 to extract, from the ingress overlay network node and based on the credentials, route information and encapsulation information of the traffic flow. The route information may include an IP address of the egress overlay network node, a virtual network identifier (VNI), and an IP address and Media Access Control (MAC) address of each of the first set of underlay network nodes. The encapsulation information may be generated based on a tunneling protocol and may include IP address of the ingress overlay network node, IP address of the egress overlay network node, UDP encapsulation source port address, and UDP encapsulation destination port address.

Instructions 406d cause network orchestrator 400 to identify, based on the route information, a first set of underlay network nodes each of which is a potential next hop for the traffic flow. In an example, in a leaf-spine network topology the underlay network nodes may be spine switches.

Instructions 406e cause network orchestrator 400 to determine, based on the encapsulation information, whether the traffic flow is received by one of the first set of underlay network nodes. In an example, encapsulation information of data packets received at each of the first set of underlay network nodes is compared with the encapsulation information of the traffic flow to be traced. In response to a match of encapsulation information at one of the set of underlay network nodes, it is identified that the traffic flow is received at the one of the set of underlay network nodes.

Instructions 406f cause network orchestrator 400 to determine whether the traffic flow is received at an egress overlay network node from one of the first set of underlay network nodes. The egress overlay network node may be a network device, such as switch, connected to the destination server. In an example, in a datacenter network deployment the egress overlay network node may be a top of the rack (ToR) switch. The egress overlay network node may function as a tunnel endpoint of the overlay network.

Instructions 406g cause network orchestrator 400 to determine a network of the traffic flow based on the determinations of whether the traffic flow is received at the ingress overlay network node, one of the first set of underlay network nodes, and the egress overlay network node.

Instructions 406h cause network orchestrator 400 to detect a failure in the network based on the network trace. The failure may include one of a fault in a link between network nodes, a fault in the ingress overlay network node, a fault in the egress overlay network node, and a fault in one of the set of underlay network nodes. In other examples, based on the network trace, the network orchestrator 400 may analyze network problems, detect network intrusion attempts, detect network misuse by internal and external users document regulatory compliance, aid in gathering information to isolate exploited systems, monitor WAN bandwidth utilization, monitor network usage, monitor WAN and endpoint security status, gather and report network statistics, identify suspect content in network traffic, troubleshoot performance problems by monitoring network data from an application, serve as the primary data source for day-to-day network monitoring and management, debug client/server communications, etc.

Overlay networking, also referred to as Software defined networking (SDN), is an approach of using software to create layers of network abstraction that can be used to run multiple separate, discrete virtualized network layers on top of the physical network. All nodes in an overlay network are connected with one another by means of logical or virtual links and each of these links correspond to a path in the underlay network.

An overlay network may be created by taking two endpoints and creating a virtual connection between them, multiple secure overlays can be built using software over existing physical networking infrastructure. These endpoints could be actual physical locations, such as a network port, or they could be logical locations designated by a software address in the networking cloud. The virtual connection between two endpoints of a network is created using routing or switching software that can apply software tags, labels, and/or encryption to create a virtual tunnel that runs through the overlay network. Generally, in overlay networks, encapsulation is used that marks the data before it is taken to its destination. When it gets to the destination, this encapsulated message is unwrapped and delivered to the destination, such as a network application.

Examples of overlay network protocols include Virtual Extensible LAN (VXLAN), Network Virtualization using Generic Encapsulation (NVGRE), Stateless Transport Tunning (SST), Generic Routing Encapsulation (GRE), Internet Protocol (IP) multicast and Network Virtualization overlays 3 (NVO3). Common examples of an overlay network are distributed systems such as virtual private networks (VPNs), peer-to-peer (P2P) networks, content delivery networks (CDNs), voice over IP (VoIP) services, and non-native software-defined networks.

Traffic flows are groups of network traffic in a SDN network that are routed based on flow-specific rules. For example, a traffic flow may include all network traffic identified as being related to social media applications. All network traffic that is identified as being related to social media applications may be subject to low quality of service requirements in comparison to video or audio streaming. Further, network traffic in the social media flow may be subject to additional security screening (e.g. firewall), role-based limitations (e.g. only the marketing department has access to social media while on the enterprise network), or other routing preferences.

A network node is a connection point that can receive, create, store or send data along distributed network routes. Each network node may be configured to recognize, process and forward transmissions to other network nodes. In an example, a network node may be a physical electronic device that is attached to a network, and is capable of creating, receiving, or transmitting information over a communications channel.

Routes are paths through a network. Often, "flows" and "routes" are used as near-synonyms. "Flows" can often describe both the classification of packets to a flow pattern, as well as the path those classified packets take through the SDN overlay network. "Routes" more often refer to the path those packets take through the physical underlay network.

A network orchestrator is a service (e.g. instructions stored in a non-transitory, computer-readable medium and executed by processing circuitry) executed on a computing device that orchestrates switching and routing across a SDN. In some examples, the network orchestrator executes on a computing device in a core site LAN of the SDN. In some other examples, the network orchestrator executes on a cloud computing device. The network orchestrator may be provided to the SD-WAN as a service (aaS). The network orchestrator gathers network operating information from various network devices of the SDN, including network traffic load information, network topology information, network usage information, etc. The network orchestrator then transmits commands to various network devices of the SDN to alter network topology and network routing in order to achieve various network efficiency and efficacy goals.

A network device is a device that receives network traffic and forwards the network traffic to a destination. Network devices may include, among other devices, network orchestrators, access points, switches, routers, bridges, and gateways. Certain network devices may be SDN capable, and thus can receive network commands from a network orchestrator or an orchestrator and adjust operation based on the received network commands. Some network devices execute packets services, such as application classification and deep packet inspection, on certain network traffic that is received at the network device. Some network devices monitor load parameters for various physical and logical resources of the network device, and report load information to a network orchestrator or an orchestrator.

Processing circuitry is circuitry that receives instructions and data and executes the instructions. Processing circuitry may include application specific integrated circuits (ASICs), field programmable gate arrays (FPGAs), micronetwork orchestrators (uCs), central processing units (CPUs), graphics processing units (GPUs), microprocessors, or any other appropriate circuitry capable of receiving instructions and data and executing the instructions. Processing circuitry may include one processor or multiple processors. Processing circuitry may include caches. Processing circuitry may interface with other components of a device, including memory, network interfaces, peripheral devices, supporting circuitry, data buses, or any other appropriate component. Processors of a processing circuitry may communicate to one another through shared cache, interprocessor communication, or any other appropriate technology.

Memory is one or more non-transitory computer-readable medium capable of storing instructions and data. Memory may include random access memory (RAM), read only memory (ROM), processor cache, removable media (e.g. CD-ROM, USB Flash Drive), storage drives (e.g. hard drive (HDD), solid state drive (SSD)), network storage (e.g. network attached storage (NAS)), and/or cloud storage. In this disclosure, unless otherwise specified, all references to memory, and to instructions and data stored in memory, can refer to instructions and data stored in any non-transitory computer-readable medium capable of storing instructions and data or any combination of such non-transitory computer-readable media.

The features of the present disclosure can be implemented using a variety of specific devices that contain a variety of different technologies and characteristics. As an example, features that include instructions to be executed by processing circuitry may store the instructions in a cache of the processing circuitry, in random access memory (RAM), in hard drive, in a removable drive (e.g. CD-ROM), in a field programmable gate array (FPGA), in read only memory (ROM), or in any other non-transitory, computer-readable medium, as is appropriate to the specific device and the specific example implementation. As would be clear to a person having ordinary skill in the art, the features of the present disclosure are not altered by the technology, whether known or as yet unknown, and the characteristics of specific devices the features are implemented on. Any modifications or alterations that would be required to implement the features of the present disclosure on a specific device or in a specific example would be obvious to a person having ordinary skill in the relevant art.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

We claim:

1. A method for tracing a traffic flow in a network, comprising:
   receiving, by a network orchestrator, credentials associated with the traffic flow based on a user input;
   determining, by the network orchestrator, whether the traffic flow is received at an ingress overlay network node based on the credentials;
   extracting, by the network orchestrator, route information and encapsulation information of the traffic flow from the ingress overlay network node based on the credentials;
   identifying, by the network orchestrator, a first set of underlay network nodes based on the route information, wherein a respective node of the first set of underlay network nodes is a potential next hop from the ingress overlay network node for the traffic flow;
   determining, by the network orchestrator, whether the traffic flow is received by one of the first set of underlay network nodes based on the encapsulation information;
   determining, by the network orchestrator, whether the traffic flow is received at an egress overlay network node from one of the first set of underlay network nodes based on the credentials;
   determining a network trace of the traffic flow based on the determinations of whether the traffic flow is received at the ingress overlay network node, one of the first set of underlay network nodes, and the egress overlay network node; and
   detecting, by the network orchestrator, a failure in the network based on the network trace, wherein the failure includes one of a fault in a link between network nodes, a fault in the ingress overlay network node, a fault in the egress overlay network node, and a fault in one of the first set of underlay network.

2. The method of claim 1, wherein determining whether the traffic flow is received by one of the first set of underlay network nodes comprises:
   comparing encapsulation information of data packets received at each of the first set of underlay network nodes with the encapsulation information of the traffic flow; and
   in response to determining a match for the encapsulation information of the traffic flow at one of the set of underlay network nodes, identifying that the traffic flow is received at the one of the set of underlay network nodes.

3. The method of claim 1, further comprising:
   in response to determining that the traffic flow is received at one of the first set of underlay network nodes, identifying a second set of underlay network nodes based on a combination of the route information and data paths originating from the one of the first set of underlay network nodes; and
   determining, by the network orchestrator, whether the traffic flow is received by one of the second set of underlay network nodes based on the encapsulation information of the traffic flow.

4. The method of claim 1, wherein the credentials associated with the traffic flow includes one or more of: an Internet Protocol (IP) address and a Transmission Control Protocol (TCP)/User Datagram Protocol (UDP) port address of a source server and an IP address and TCP/UDP port address of a destination server, and wherein the traffic flow is directed from the source server to the destination server.

5. The method of claim 1, wherein the ingress overlay network node and the egress overlay network node are tunnel endpoints of a tunnel carrying the traffic flow.

6. The method of claim 1, wherein each of the first set of underlay network nodes is identified as the potential next hop based on Equal Cost Multi-Path (ECMP) routing.

7. The method of claim 1, wherein the encapsulation information is generated based on a tunneling protocol.

8. The method of claim 1, wherein the encapsulation information includes one or more of: an Internet Protocol (IP) address of the ingress overlay network node, an IP address of the egress overlay network node, User Datagram Protocol (UDP) encapsulation source port address, and UDP encapsulation destination port address.

9. The method of claim 1, wherein the route information one or more of: includes an Internet Protocol (IP) address of the egress overlay network node, a virtual network identifier (VNI), and an IP address and Media Access Control (MAC) address of each of the first set of underlay network nodes.

10. The method of claim 1, wherein the network is one of: a datacenter network and a campus network.

11. A network orchestrator, comprising: a processing circuitry; and
   a non-transitory, computer-readable medium including instructions that, when executed by the processing circuitry, cause the network orchestrator to:
      receive credentials associated with a traffic flow based on a user input;

determine whether the traffic flow is received at an ingress overlay network node based on the credentials;

extract route information and encapsulation information of the traffic flow from the ingress overlay network node based on the credentials;

identify a first set of underlay network nodes based on the route information, wherein a respective node of the first set of underlay network nodes is a potential next hop from the ingress overlay network node for the traffic flow;

determine whether the traffic flow is received by one of the first set of underlay network nodes based on the encapsulation information;

determine whether the traffic flow is received at an egress overlay network node from one of the first set of underlay network nodes based on the credentials;

determine a network trace of the traffic flow based on the determinations of whether the traffic flow is received at the ingress overlay network node, one of the first set of underlay network nodes, and the egress overlay network node; and detect a failure in the network based on the network trace, wherein the failure includes one of a fault in a link between network nodes, a fault in the ingress overlay network node, a fault in the egress overlay network node, and a fault in one of the first set of underlay network nodes.

12. The network orchestrator of claim 11, wherein determining whether the traffic flow is received by one of the first set of underlay network nodes, comprises:

comparing encapsulation information of data packets received at each of the first set of underlay network nodes with the encapsulation information of the traffic flow; and in response to determining a match for the encapsulation information of the traffic flow at one of the set of underlay network nodes, identifying that the traffic flow is received at the one of the set of underlay network nodes.

13. The network orchestrator of claim 11, further comprising instructions to:

in response to determining that the traffic flow is received at one of the set of underlay network nodes, identify a second set of underlay network nodes based on a combination of the route information and data paths originating from the one of the first set of underlay network nodes; and determine whether the traffic flow is received by one of the second set of underlay network nodes based on the encapsulation information.

14. The network orchestrator of claim 11, wherein the encapsulation information is generated based on a tunneling protocol.

15. The network orchestrator of claim 11, wherein each of the first set of underlay network nodes is identified as the potential next hop based on Equal Cost Multi-Path (ECMP) routing.

16. A non-transitory, computer readable medium including instructions that, when executed by processing circuitry, cause a network device to:

receive credentials associated with a traffic flow based on a user input;

determine whether the traffic flow is received at an ingress overlay network node based on the credentials;

extract route information and encapsulation information of the traffic flow from the ingress overlay network node based on the credentials;

identify a first set of underlay network nodes based on the route information, wherein a respective node of the first set of underlay network nodes is a potential next hop from the ingress overlay network node for the traffic flow;

determine whether the traffic flow is received by one of the first set of underlay network nodes based on the encapsulation information;

determine whether the traffic flow is received at an egress overlay network node from one of the first set of underlay network nodes based on the credentials;

determine a network trace of the traffic flow based on the determinations of whether the traffic flow is received at the ingress overlay network node, one of the first set of underlay network nodes, and the egress overlay network node; and detect a failure in the network based on the network trace, wherein the failure includes one of a fault in a link between network nodes, a fault in the ingress overlay network node, a fault in the egress overlay network node, and a fault in one of the first set of underlay network nodes.

17. The non-transitory computer-readable medium of claim 16, wherein determining whether the traffic flow is received by one of the first set of underlay network nodes, comprises:

comparing encapsulation information of data packets received at each of the first set of underlay network nodes with the encapsulation information of the traffic flow; and in response to determining a match for the encapsulation information of the traffic flow at one of the first set of underlay network nodes, identifying that the traffic flow is received at the one of the first set of underlay network nodes.

18. The non-transitory computer-readable medium of claim 16, further comprising instructions that, when executed by processing circuitry, cause the network device to:

in response to determining that the traffic flow is received at one of the set of underlay network nodes, identify a second set of underlay network nodes based on a combination of the route information and data paths originating from the one of the first set of underlay network nodes; and determine whether the traffic flow is received by one of the second set of underlay network nodes based on the encapsulation information.

19. The non-transitory computer-readable medium of claim 16, wherein credentials associated with the traffic flow includes one or more of: an Internet Protocol (IP) address and a Transmission Control Protocol (TCP)/User Datagram Protocol (UDP) port address of a source server and an IP address and TCP/UDP port address of a destination server, wherein the traffic flow is directed from the source server to the destination server.

20. The non-transitory computer-readable medium of claim 16, wherein the ingress overlay network node and the egress overlay network node are tunnel endpoints of a tunnel carrying the traffic flow.

* * * * *